United States Patent
Gassman et al.

(10) Patent No.: US 10,583,738 B2
(45) Date of Patent: Mar. 10, 2020

(54) MULTI-POSITION ELECTRONIC SMART SUNSHADE

(71) Applicant: Inteva Products, LLC, Troy, MI (US)

(72) Inventors: Kenneth Gassman, Lake Orion, MI (US); David Whitehead, Rochester Hills, MI (US); Jeremy Martin, Brighton, MI (US); Aidano Nascimento, Rochester, NY (US); Larry (Liangliang) Cao, Novi, MI (US); Michael Roy, Macomb Township, MI (US); Michael Maddelein, Northville, MI (US)

(73) Assignee: INTEVA PRODUCTS, LLC, Troy, MI (US)

( * ) Notice: Subject to any disclaimer, the term of this patent is extended or adjusted under 35 U.S.C. 154(b) by 0 days.

(21) Appl. No.: 16/142,863

(22) Filed: Sep. 26, 2018

(65) Prior Publication Data

US 2019/0092170 A1 Mar. 28, 2019

Related U.S. Application Data

(60) Provisional application No. 62/563,413, filed on Sep. 26, 2017.

(51) Int. Cl.
*B60K 35/00* (2006.01)
*B60R 11/02* (2006.01)
(Continued)

(52) U.S. Cl.
CPC ............. *B60K 35/00* (2013.01); *B60J 3/0204* (2013.01); *B60R 1/00* (2013.01); *B60R 11/0229* (2013.01); *B60R 11/0235* (2013.01); *G09G 3/3208* (2013.01); *B60K 2370/152* (2019.05); *B60K 2370/67* (2019.05); *B60K 2370/771* (2019.05);
(Continued)

(58) Field of Classification Search
CPC .............. B60K 35/00; B60K 2370/777; B60K 2370/21; B60K 2370/67; B60K 2370/152
See application file for complete search history.

(56) References Cited

U.S. PATENT DOCUMENTS

| 7,232,176 B1 * | 6/2007 | Dopwell | B60J 3/0204 160/23.1 |
| 2003/0202020 A1 * | 10/2003 | Matko | B60J 3/0204 348/836 |

(Continued)

OTHER PUBLICATIONS

English Translation CN Office Action for Application No. 201821578827.0; dated Mar. 8, 2019.
(Continued)

*Primary Examiner* — Gerald Johnson
(74) *Attorney, Agent, or Firm* — Cantor Colburn LLP

(57) ABSTRACT

A deployable display for use in a vehicle is provided. The deployable display can be positioned in a plurality of stowed or a plurality of deployed positions, wherein the deployable display functions as a sun visor located in front of a windshield of the vehicle when it is in a first one of the plurality of deployed positions and when the deployable display is in a second one of the plurality of deployed positions or the first one of the plurality of deployed positions the deployable display functions as a screen that provides images from a controller operatively coupled to the deployable display.

20 Claims, 14 Drawing Sheets

(51) Int. Cl.
  *B60J 3/02* (2006.01)
  *B60R 1/00* (2006.01)
  *G09G 3/3208* (2016.01)
  *G01C 21/36* (2006.01)
  *B60R 11/00* (2006.01)
  *G05D 1/02* (2020.01)
  *G09G 3/36* (2006.01)

(52) U.S. Cl.
  CPC ... *B60K 2370/777* (2019.05); *B60R 2011/008* (2013.01); *B60R 2011/0035* (2013.01); *B60R 2011/0043* (2013.01); *B60R 2300/105* (2013.01); *B60R 2300/20* (2013.01); *B60R 2300/205* (2013.01); *B60R 2300/8046* (2013.01); *G01C 21/3661* (2013.01); *G01C 21/3682* (2013.01); *G05D 1/0231* (2013.01); *G09G 3/36* (2013.01); *G09G 2300/026* (2013.01); *G09G 2380/02* (2013.01); *G09G 2380/10* (2013.01)

(56) References Cited

U.S. PATENT DOCUMENTS

| | | | |
|---|---|---|---|
| 2004/0021618 A1* | 2/2004 | Matko | B60J 3/0204 345/8 |
| 2015/0360618 A1* | 12/2015 | Richard | B60R 11/04 348/148 |
| 2017/0313248 A1* | 11/2017 | Kothari | B60K 35/00 |
| 2018/0236849 A1* | 8/2018 | Lee | B60J 3/0204 |

OTHER PUBLICATIONS

CN Office Action for Application No. 201821578827.0; dated Mar. 8, 2019.

* cited by examiner

MULTI-POSITION ELECTRONIC SMART SUNSHADE

CROSS REFERENCE TO RELATED APPLICATIONS

This application claims the benefit of U.S. Provisional Patent Application Ser. No. 62/563,413 filed on Sep. 26, 2017, the entire contents of which are incorporated herein by reference thereto.

BACKGROUND

Exemplary embodiments of the present disclosure relate to multi-positional vehicle components for enhanced features. In particular and in one embodiment a multi-positional sunshade providing a media source is contemplated.

As autonomous vehicles make their way into the lives of consumers, there will be a need for entertainment during any length of drive. As operator attentiveness may no longer be required there is an opportunity for additional occupant enhancements.

Accordingly, it is desirable to provide an optional media sources in a vehicle.

BRIEF DESCRIPTION

Disclosed herein is a deployable display for use in a vehicle is provided. The deployable display being capable of being positioned in a stowed or deployed position, wherein the deployable display when in the deployed position functions as a sun visor located in front of a windshield of the vehicle and the deployable display is a liquid crystal display or an organic light-emitting diode display.

Also disclosed herein is a deployable display for use in a vehicle is provided. The deployable display being capable of being positioned in a stowed or deployed position, wherein the deployable display when in the deployed position functions as a sun visor located in front of a windshield of the vehicle an organic light-emitting diode display deployed from a roller.

Also disclosed herein is a deployable display for use in a vehicle is provided. The deployable display being capable of being positioned in a stowed or deployed position, wherein the deployable display when in the deployed position functions as a media display located in front of a windshield of the vehicle and the deployable display is a liquid crystal display or an organic light-emitting diode display.

Also disclosed herein is a deployable display for use in a vehicle.

Also disclosed herein is a deployable display for use in a vehicle. The deployable display can be positioned in a plurality of stowed or a plurality of deployed positions, wherein the deployable display functions as a sun visor located in front of a windshield of the vehicle when it is in a first one of the plurality of deployed positions and when the deployable display is in a second one of the plurality of deployed positions or the first one of the plurality of deployed positions the deployable display functions as a screen that provides images from a controller operatively coupled to the deployable display.

In addition to one or more of the features described above, or as an alternative to any of the foregoing embodiments, the deployable display may be a liquid crystal display or an organic light-emitting diode display.

In addition to one or more of the features described above, or as an alternative to any of the foregoing embodiments, the deployable display may be an organic light-emitting diode display deployed from a roller.

In addition to one or more of the features described above, or as an alternative to any of the foregoing embodiments, one of the plurality of stowed positions is adjacent to the windshield of the vehicle and another one of the plurality of stowed positions is above a rear seat of the vehicle.

In addition to one or more of the features described above, or as an alternative to any of the foregoing embodiments, the second one of the plurality of deployed positions is located in a rear seat of the vehicle.

In addition to one or more of the features described above, or as an alternative to any of the foregoing embodiments, the deployable display may be operatively coupled to a camera that provides views from a rear or sides or front of the vehicle.

In addition to one or more of the features described above, or as an alternative to any of the foregoing embodiments, the deployable display may be integrated with a roof system of the vehicle.

In addition to one or more of the features described above, or as an alternative to any of the foregoing embodiments, the deployable display may be provided with a viewing area that has an area less that the entire viewing area of the deployable display and the deployable display is operably coupled to a camera such that views from the rear or sides or front of the vehicle are provided in the viewing area.

In addition to one or more of the features described above, or as an alternative to any of the foregoing embodiments, the deployable display may be operatively coupled data storage to provide anyone of visual displays, instrument and sensor readings, and GPS displays.

In addition to one or more of the features described above, or as an alternative to any of the foregoing embodiments, the data storage may be associated with the controller.

In addition to one or more of the features described above, or as an alternative to any of the foregoing embodiments, the deployable display may be a flexible display that is wound and unwound from a roller.

In addition to one or more of the features described above, or as an alternative to any of the foregoing embodiments, the roller may be integrated with the roof system of the vehicle.

In addition to one or more of the features described above, or as an alternative to any of the foregoing embodiments, the roller may be integrated with an instrument panel of the vehicle.

In addition to one or more of the features described above, or as an alternative to any of the foregoing embodiments, the roller and the deployable display may be divided into two components such that the deployable display on one side of the roller may be positioned in a different location than the deployable display on the other side of the roller.

In addition to one or more of the features described above, or as an alternative to any of the foregoing embodiments, the roller and the deployable display may be divided into multiple components that are located in multiple locations within the vehicle.

In addition to one or more of the features described above, or as an alternative to any of the foregoing embodiments, the deployable display when in the stowed position may be used as anyone of the following: a) a screen saver; b) ambient lighting; c) simulated environments; d) entertainment display; e) tinting; f) video conferencing; g) vanity mirror; and combinations thereof.

In addition to one or more of the features described above, or as an alternative to any of the foregoing embodiments, the deployable display when in the deployed position may be used as anyone of the following: a) a sun visor; b) a rearview mirror; c) a heads up display; d) points of interest provided on a map; e) augmented reality; f) instrument panel cluster information; and combinations thereof.

Also disclosed herein is a method of providing a deployable display in a vehicle, the method including the steps of: positioning the deployable display in a plurality of stowed or a plurality of deployed positions, wherein the deployable display functions as a sun visor located in front of a windshield of the vehicle when it is in a first one of the plurality of deployed positions and when the deployable display is in a second one of the plurality of deployed positions or the first one of the plurality of deployed positions the deployable display functions as a screen that provides images from a controller operatively coupled to the deployable display.

Also disclosed herein is a vehicle including, a deployable display, wherein the deployable display can be positioned in a plurality of stowed or a plurality of deployed positions, wherein the deployable display functions as a sun visor located in front of a windshield of the vehicle when it is in a first one of the plurality of deployed positions and when the deployable display is in a second one of the plurality of deployed positions or the first one of the plurality of deployed positions the deployable display functions as a screen that provides images from a controller operatively coupled to the deployable display.

In addition to one or more of the features described above, or as an alternative to any of the foregoing embodiments, the vehicle may be an autonomous vehicle.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
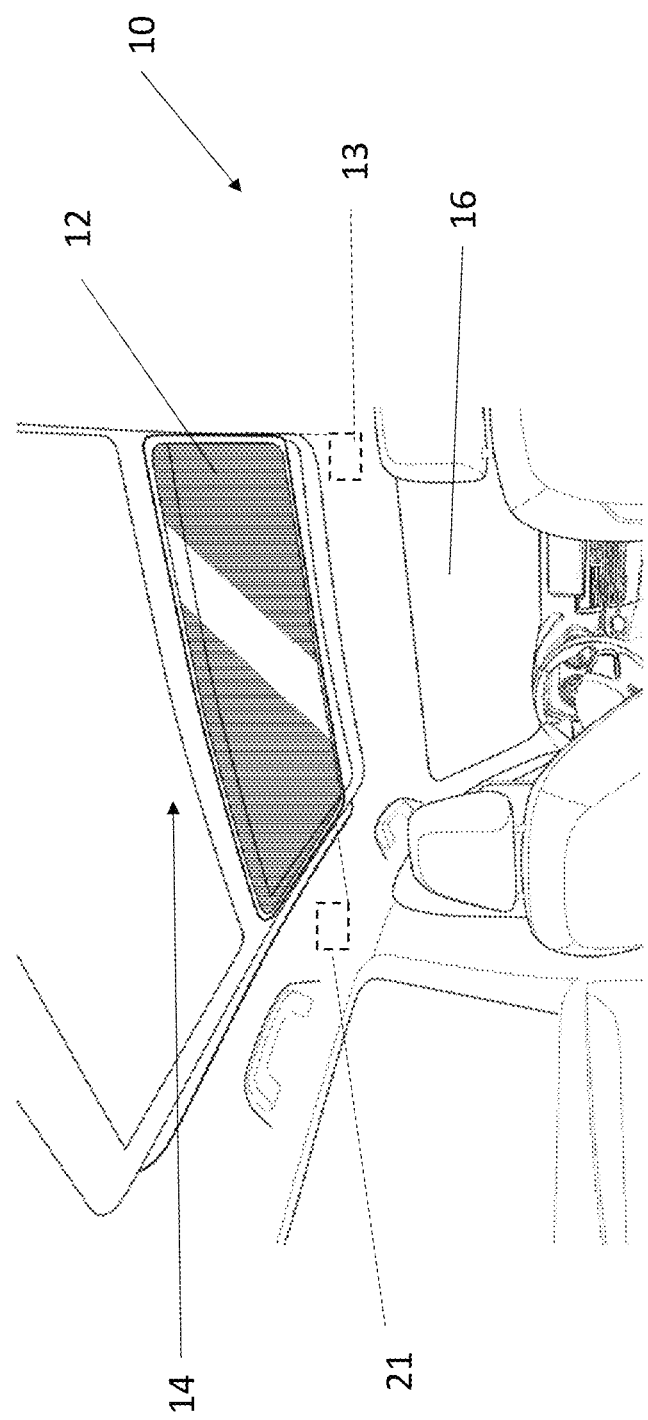
FIG. 1 is a partial interior view of a vehicle with a deployable item or deployable display or deployable component in accordance with an embodiment of the present disclosure, wherein the deployable item or deployable display or deployable component is in a first position or stowed position.

FIG. 1 schematically illustrates a vehicle 10 with a deployable item or deployable display or deployable component 12. In accordance with various embodiments of the present disclosure the deployable item or deployable display or deployable component 12 may also be referred to as a sun shade, a heads up display, a feature of the vehicle, a media device and/or a combination thereof. In one non-limiting embodiment, the deployable item or deployable display or deployable component 12 may be a liquid crystal display (LCD) or an organic light-emitting diode display (OLED) or any other equivalent types of displays.

In one embodiment, the deployable item or deployable display or deployable component 12 may be rigid or in another embodiment, the deployable item or deployable display or deployable component 12 may be flexible.

As used herein the deployable item or deployable display or deployable component 12 may be provided with an autonomous vehicle wherein operator views are not completely necessary or in a non-autonomous vehicle wherein operator views are completely necessary or a vehicle capable of operating in both autonomous and non-autonomous modes.

Figure 2:
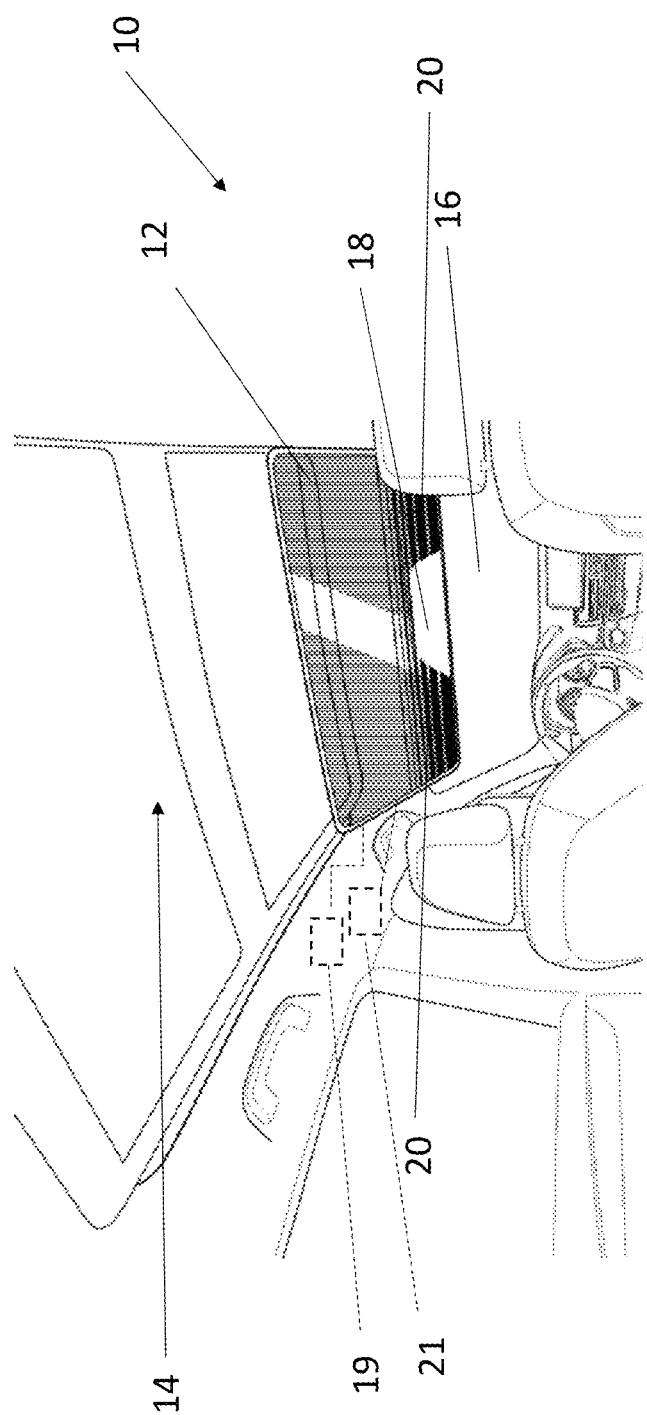
FIG. 2 is a partial interior view of a vehicle with a deployable item or deployable display or deployable component in accordance with an embodiment of the present disclosure, wherein the deployable item or deployable display or deployable component is in a second or deployed position.

In FIG. 1, the deployable item or deployable display or deployable component 12 is in a stowed position while in FIG. 2, the deployable item or deployable display or deployable component 12 is in a deployed position. As used herein and with at least the embodiment of FIG. 1, the deployed position may refer to a partially deployed position from the stowed position (see at least FIG. 2) or a fully deployed position from the stowed position (see at least FIG. 3). Deployment of the deployable item or deployable display or deployable component 12 may be facilitated by a motor or actuation device 13 illustrated schematically in the FIGS. It being understood that the location of the motor or actuation device 13 may be in any suitable location and may attached to or integrated with the deployable display or deployable component 12. In one embodiment, the deployable item or deployable display or deployable component 12 may be associated or integrated with a roof system 14 of the vehicle 10. In one embodiment, the roof system may have sunroof or glass portion that allows light into the vehicle. The roof system may be fixed or deployable to provide an opening in the roof of the vehicle.

In FIG. 2, the deployable item or deployable display or deployable component 12 is positioned to partially cover a windshield 16 of the vehicle 10. As mentioned above, the deployable item or deployable display or deployable component 12 may be a LCD or OLED or any equivalent device wherein an applied current can change the transmissivity of the deployable item or deployable display or deployable component 12 such that light entering the vehicle 10 may be blocked. In one embodiment the applied current may be provided by a controller or microcontroller 21 operatively coupled to the deployable item or deployable display or deployable component 12. The controller or microcontroller 21 may be located anywhere in the vehicle and/or may be integrated with the deployable item or deployable display or deployable component 12. In addition, multiple controllers or microcontrollers 21 may be employed.

In addition and as illustrated in at least FIG. 2, the deployable item or deployable display or deployable component 12 may be provided with a viewing area 18, which in one non-limiting embodiment, may be operably coupled to a camera or cameras 19 (illustrated schematically) that can provide the vehicle occupant with a view from the rear or sides or front or other locations of the vehicle. The camera or cameras 19 may be wirelessly or directly (e.g., wired connection) coupled to the deployable display or deployable component 12. As such, area 18 may operate as a rear view mirror or side view mirror or other display. In FIG. 2 the darker areas 20 may be referred to as the shaded areas wherein light or glare is prevented from entering into the vehicle.

Figure 2A:
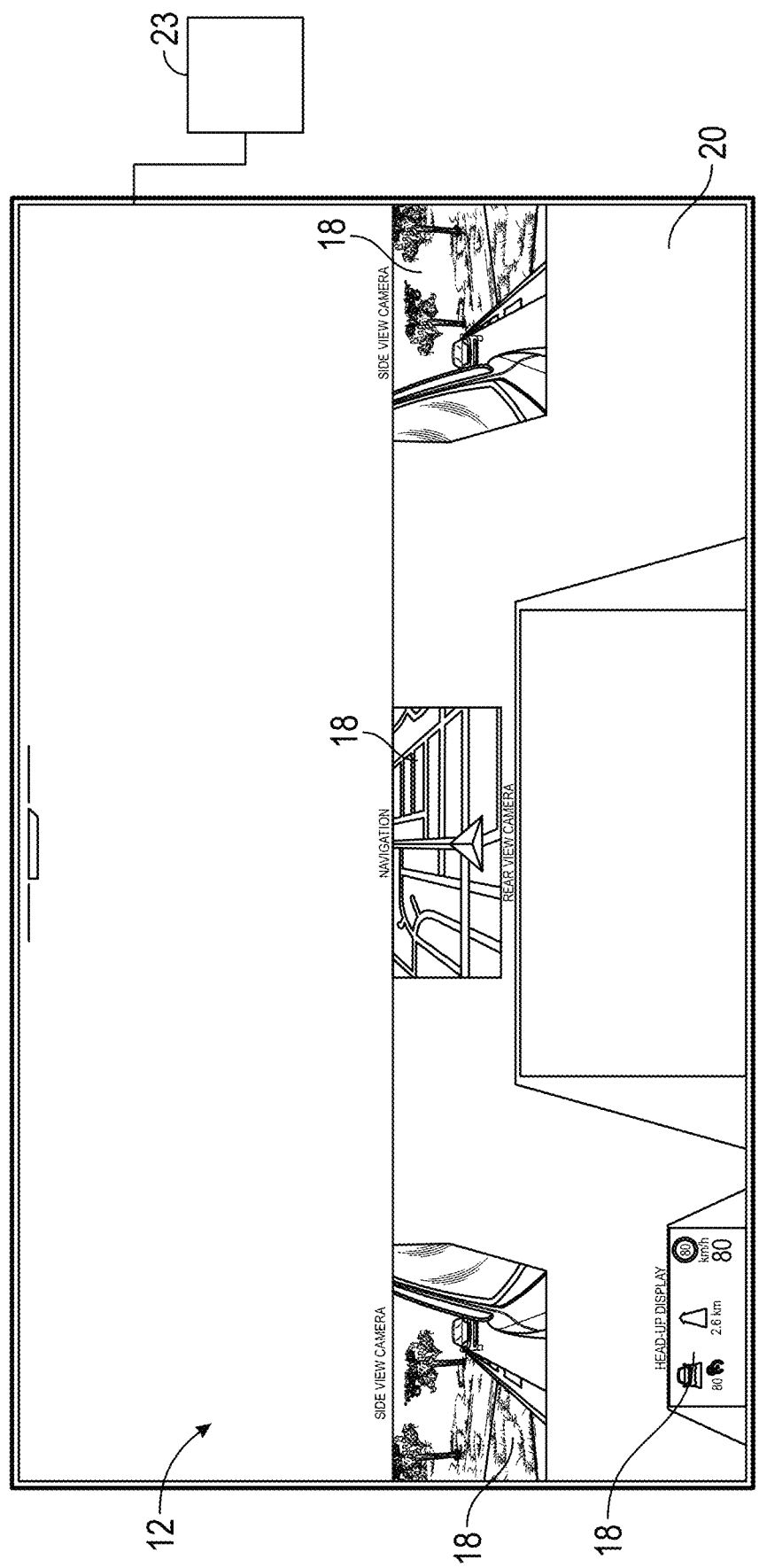
FIG. 2A illustrates one contemplated view of the deployable item or deployable display or deployable component in accordance with an embodiment of the present disclosure.

FIG. 2A illustrates some potential views from the camera or cameras 19 and/or controller or microcontroller 21 which may or may not be utilized either alone or in combination with each other. As shown, the views may be only positioned on portions of the deployable item or deployable display or deployable component 12.

Figure 3:
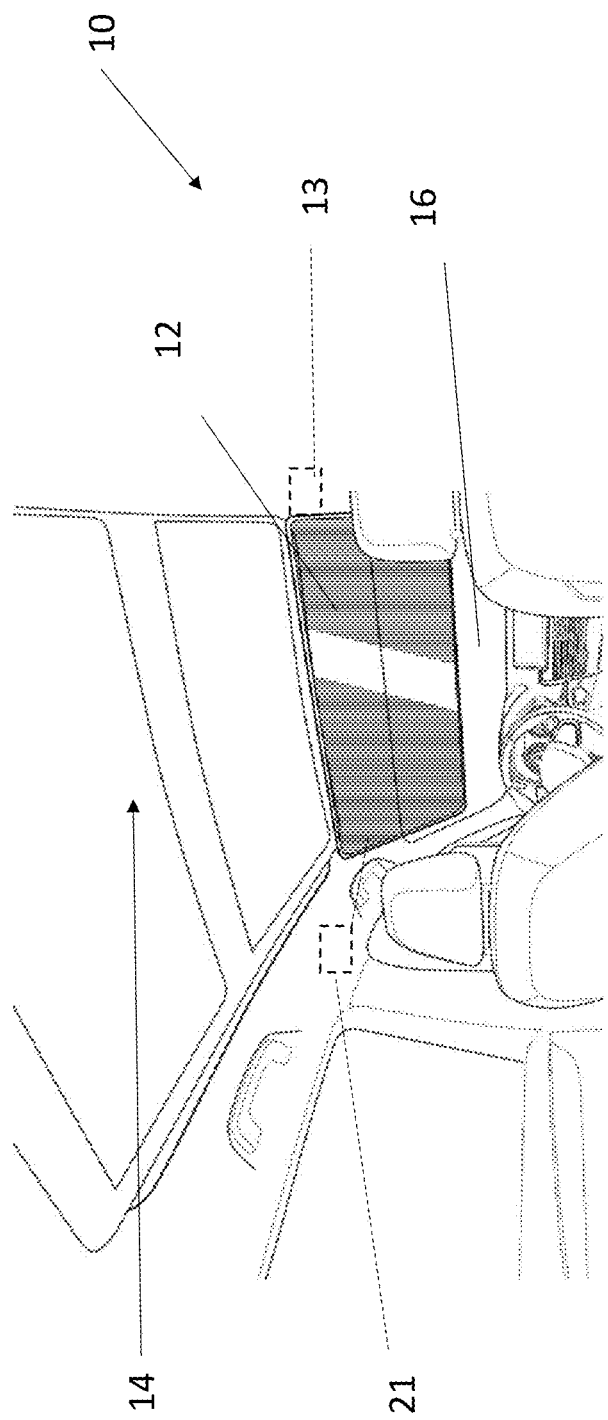
FIG. 3 is a partial interior view of a vehicle with a deployable item or deployable display or deployable component in accordance with another embodiment of the present disclosure, wherein the deployable item or deployable display or deployable component is in a third or another deployed position.

Referring now to FIG. 3, an alternative configuration is provided. Here, the deployable item or deployable display or deployable component 12 may be provided as a media or instrument panel display for operation in autonomous mode. In other words and in one embodiment, the deployable item or deployable display or deployable component 12 is configured for use with an autonomous vehicle or vehicle that can operate in a self-driving mode or driver assist mode. The deployable item or deployable display or deployable component 12 may be operatively coupled to components of data storage to provide anyone of visual displays, instrument and sensor readings, global positioning systems (GPS) displays, etc. The components of the data storage may be associated with or part of a controller or microcontroller 21 operatively coupled to the deployable item or deployable display or deployable component 12 receiving and providing signals to the deployable item or deployable display or deployable component 12. In one embodiment, the deployable item or deployable display or deployable component 12 may have a selector or user interface 23 (illustrated schematically in FIG. 2A) that may be any one of a push button, sensor, switch or any other equivalent device capable of providing signals to the microcontroller in order to operate the deployable item or deployable display or deployable component 12. The user interface 23 may located in any area of the vehicle or on the deployable display or deployable component 12.

In one non-limiting exemplary embodiment, controller or microcontroller 21 comprises a microprocessor, microcontroller or other equivalent processing device capable of executing commands of computer readable data or program for executing a control algorithm that controls the operation of the deployable item or deployable display or deployable component 12. In order to perform the prescribed functions and desired processing, as well as the computations therefore (e.g., the execution of fourier analysis algorithm(s), the control processes prescribed herein, and the like), the controller may include, but not be limited to, a processor(s), computer(s), memory, storage, register(s), timing, interrupt(s), communication interfaces, and input/output signal interfaces, as well as combinations comprising at least one of the foregoing. For example, the controller may include input signal filtering to enable accurate sampling and conversion or acquisitions of such signals from communications interfaces. Again, the deployable item or deployable display or deployable component 12 may also operate as a sunshade.

Figure 4:
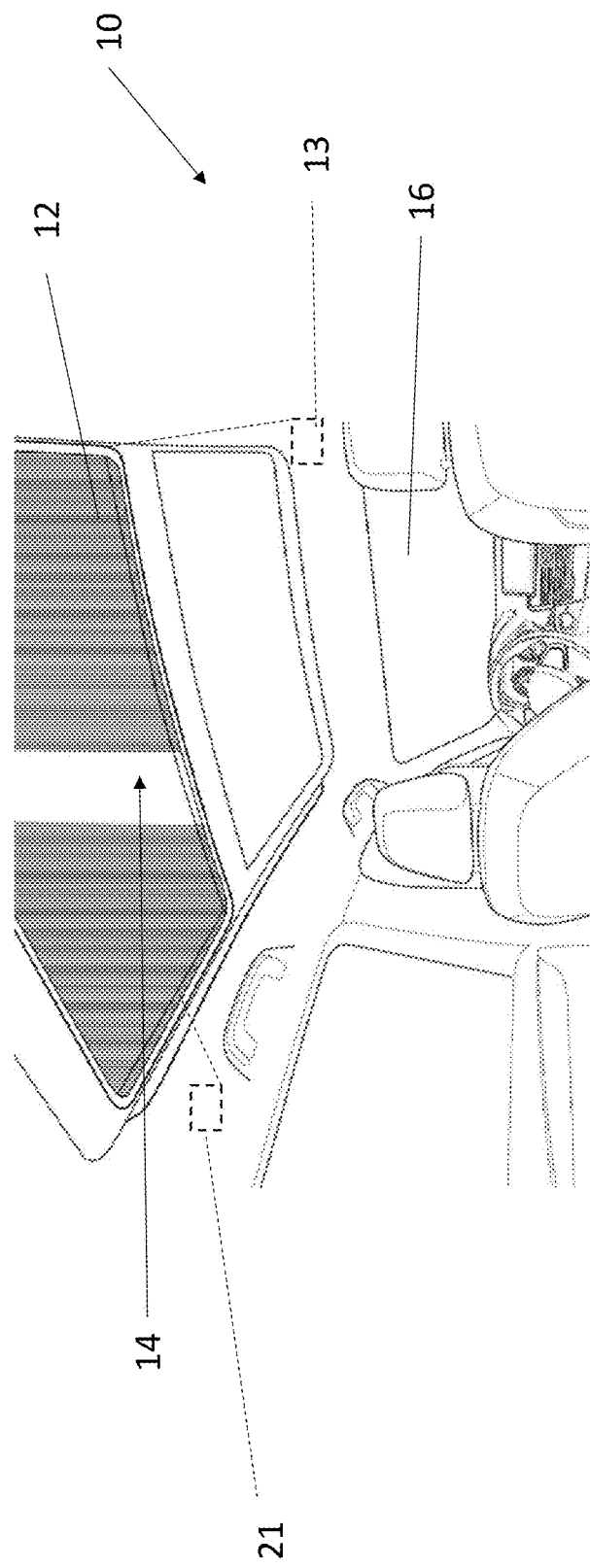
FIG. 4 is a partial interior view of a vehicle with a deployable item or deployable display or deployable component in accordance with yet another embodiment of the present disclosure, wherein the deployable item or deployable display or deployable component is in a first position or stowed position.
Figure 5:
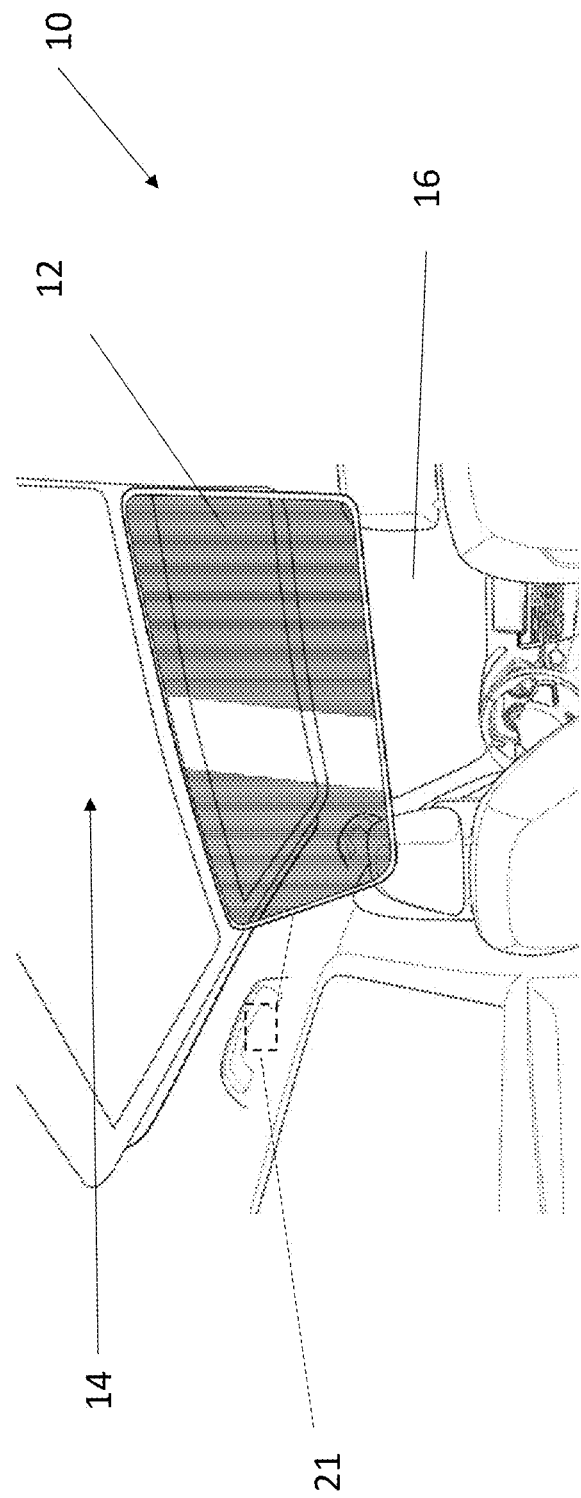
FIG. 5 is view of the FIG. 4 embodiment, wherein the deployable item or deployable display or deployable component is in a second or deployed position.

Referring now to FIG. 4, the deployable item or deployable display or deployable component 12 may be positioned for use by occupants located in the rear of the vehicle. In FIG. 4, the deployable item or deployable display or deployable component 12 is in a stowed position and in FIG. 5 it is in a deployed position where it is located in front of the rear seat and before the front seats of the vehicle so it may be viewed by the occupants of the vehicle in the rear seat.

Figure 6:
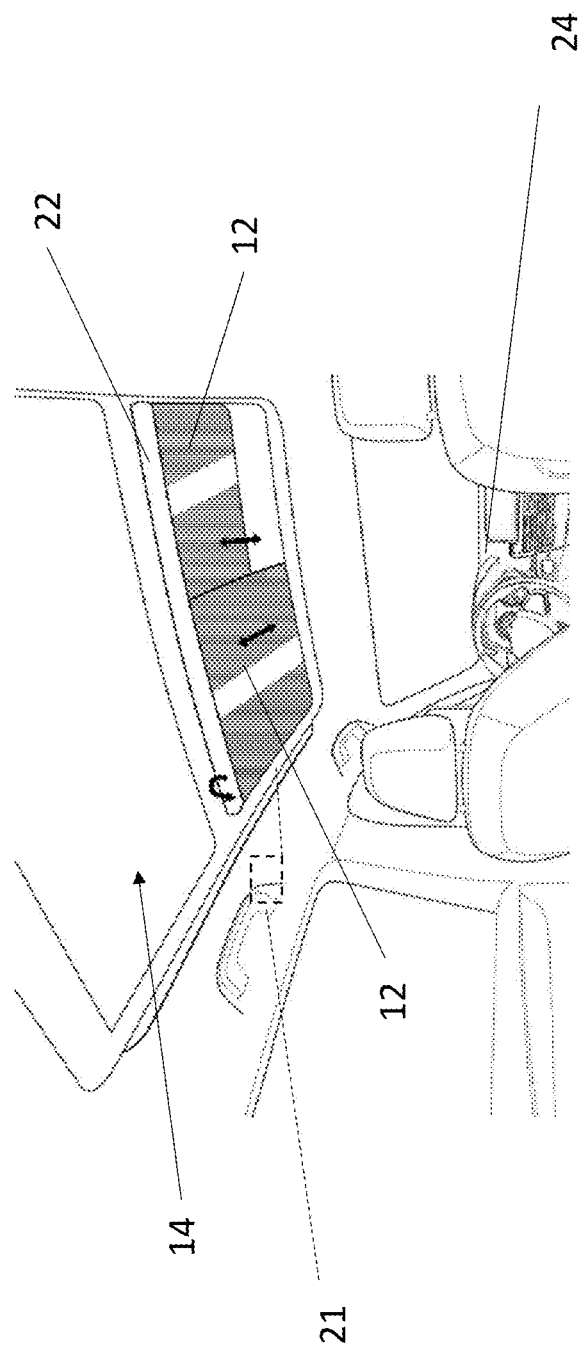
FIG. 6 is a partial interior view of a vehicle with a deployable item or deployable display or deployable component in accordance with yet another embodiment of the present disclosure, wherein the deployable item or deployable display or deployable component is in a first position or stowed position.
Figure 7:
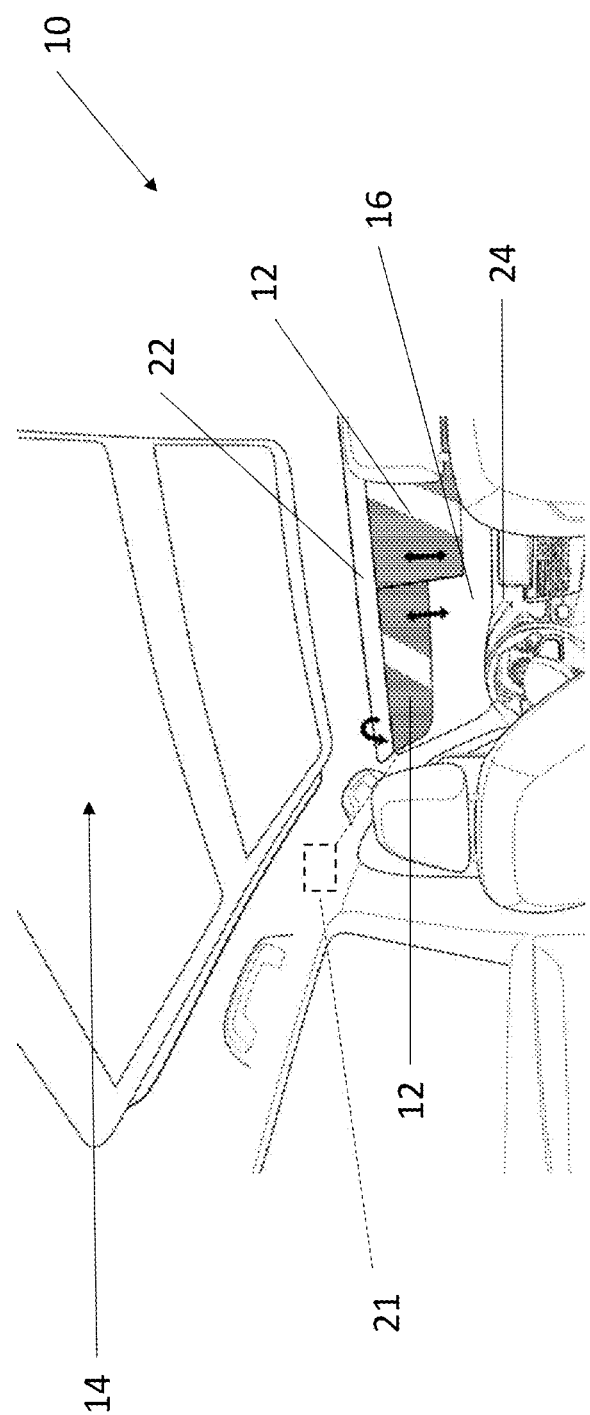
FIG. 7 is view of the FIG. 6 embodiment, wherein the deployable item or deployable display or deployable component is in a second or deployed position.

In FIGS. 6 and 7 yet another alternative embodiment is illustrated. Here, the deployable item or deployable display or deployable component 12 may be a flexible display that can be wound and unwound from a roller or rollo device 22. In FIG. 6, the roller or rollo device 22 having the deployable item or deployable display or deployable component 12 is in a stowed position and in FIG. 7, the roller or rollo device 22 having the deployable item or deployable display or deployable component 12 is in a deployed position. In one embodiment, the roller or rollo device 22 having the deployable item or deployable display or deployable component 12 may be associated with the roof system 14 of the vehicle 10. Alternatively, the roller or rollo device 22 having the deployable item or deployable display or deployable component 12 may be associated with the dashboard or instrument panel 24 of the vehicle.

Also shown in FIGS. 6 and 7, the roller or rollo device 22 having the deployable item or deployable display or deployable component 12 may be divided into two components such that the deployable item or deployable display or deployable component 12 on one side of the roller or rollo device 22 may be positioned in a different location than the deployable item or deployable display or deployable component 12 on the other side of the roller or rollo device 22.

Figure 8:
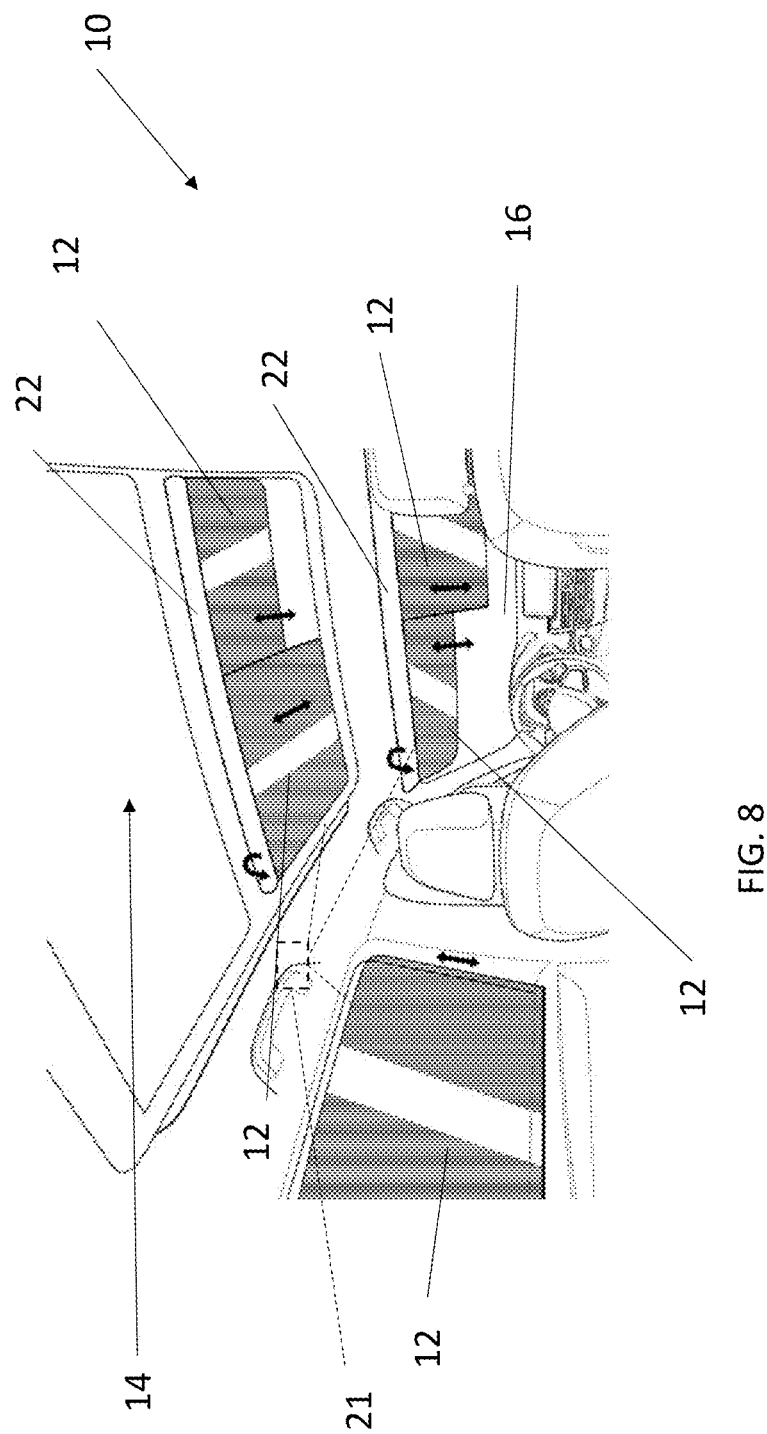
FIG. 8 is a partial interior view of a vehicle with a deployable item or deployable display or deployable component in accordance with yet another embodiment of the present disclosure.

FIG. 8 illustrates another embodiment, wherein the roller or rollo device 22 having the deployable item or deployable display or deployable component 12 may be located in multiple locations within the vehicle 10.

In accordance with various embodiments disclosed herein the deployable item or deployable display or deployable component 12 provides multiple options for keeping the driver and passengers occupied.

Even without an autonomous vehicle option the deployable item or deployable display or deployable component 12 can be used for continuous switchable tinting, given the nature of the transparent media source. In addition, a rearview mirror and sun visor will no longer be needed due to the ability of the shade to reach the windshield and provide sun protection and a view of the rear of the vehicle.

The deployable item or deployable display or deployable component 12 may be provided as a standalone feature for any vehicle, even if it does not have a sunroof or sunroof system 14 or it may be integral component of the sunroof or sunroof system 14.

Additional benefits include increasing the headroom in the vehicle and simplifying the design by eliminating sun visors and rearview mirrors.

Various embodiments of the present disclosure will create a method of displaying information inside the roof of the vehicle. It can also provide a continuous tinting effect when glass roof is present, from 0% to 100% light block options or any variance therebetween.

The deployable item or deployable display or deployable component 12 may provide entertainment while the vehicle is being driven in an autonomous fashion. The deployable item or deployable display or deployable component 12 may increase privacy by allowing media to be played in a horizontal (closed) position.

The deployable item or deployable display or deployable component 12 may allow for the removal of small-scale monitors placed behind front-row seats for rear passengers. The deployable item or deployable display or deployable component 12 may provide an additional and larger area for heads up display (HUD) for the driver and/or passengers.

The deployable item or deployable display or deployable component is separate from the windshield, avoiding potentially high repair costs of windshield-based systems. The deployable item or deployable display or deployable component 12 may also focuses driver attention straight ahead, removing distractions on instrument panel, center stack, etc.

While in the overhead or stowed position and in one non-limiting embodiment, the deployable item or deployable display or deployable component 12 may be used as anyone of the following: a) a screen saver; b) ambient lighting; c) simulated environments; d) entertainment (movie player, etc.); e) tinting (0-100% light block); f) video conferencing; vanity mirror; and combinations thereof. While in the deployed position or visor position, the deployable item or deployable display or deployable component 12 may be used as anyone of the following: a) a sun visor; b) a rearview mirror; c) a heads up display (HUD) (odometer, fuel level, time, etc.); d) points of interest (POIs) including but not limited to an indication provided on or an overlay on a map or display; e) augmented reality (AR) including but not limited to an indication provided on or an overlap on a map or display or a hair dress or make-up overlap suggestion or guidance system; f) Instrument Panel cluster information; g) artificial intelligence (AI) interface; h) video conferencing; i) camera+display replacement for vanity mirror; j) entertainment (movies, games, apps etc.) down or deployed position in both passenger rows.

The deployable item or deployable display or deployable component 12 may be controlled by voice, gesture, touch, remote, etc. As mentioned above, the deployable item or deployable display or deployable component 12 may be flexible and rolled in and out of storage compartment or the deployable item or deployable display or deployable component 12 may be rigid and moved and rotated in multiple positions.

FIGS. 9-18 illustrate additional views of various embodiments of the present disclosure. In FIGS. 9-14 deployment of the deployable item or deployable display or deployable component 12 from a stowed position (FIG. 9) to a deployed position (FIGS. 13 and 14) is illustrated. In FIGS. 9-14, the deployable item or deployable display or deployable component 12 is configured to be deployed in front or partially in front of the windshield 16 of the vehicle 10. In FIGS. 15-18 deployment of the deployable item or deployable display or deployable component 12 from a stowed position (FIG. 15) to a deployed position (FIGS. 17 and 18) is illustrated. In FIGS. 15-18, the deployable item or deployable display or deployable component 12 is configured to be deployed in rear passenger compartment of the vehicle so that it can be viewed by occupants in the rear of the vehicle 10.

Figure 9:
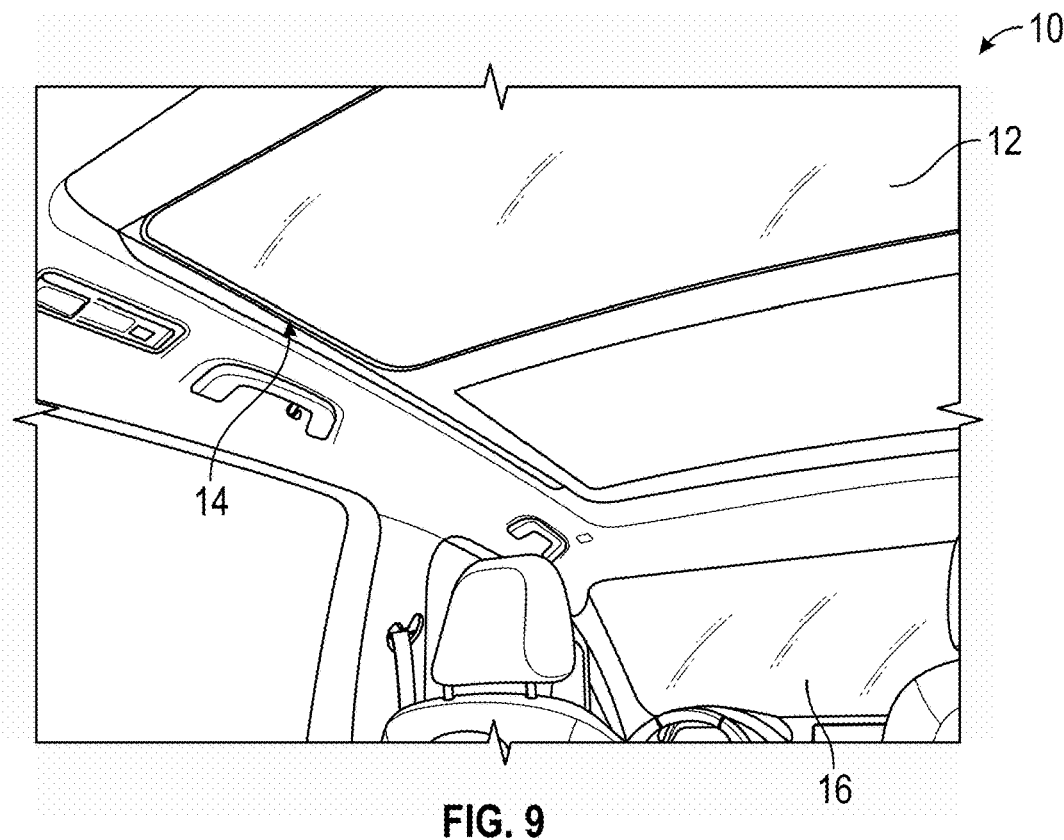
FIG. 9 is another partial interior view of a vehicle with a deployable item or deployable display or deployable component in accordance with an embodiment of the present disclosure, wherein the deployable item or deployable display or deployable component is in a first position or stowed position.

More particularly, FIG. 9 is another partial interior view of a vehicle with a deployable item or deployable display or deployable component in accordance with an embodiment of the present disclosure, wherein the deployable item or deployable display or deployable component is in a first position or stowed position.

Figure 10:
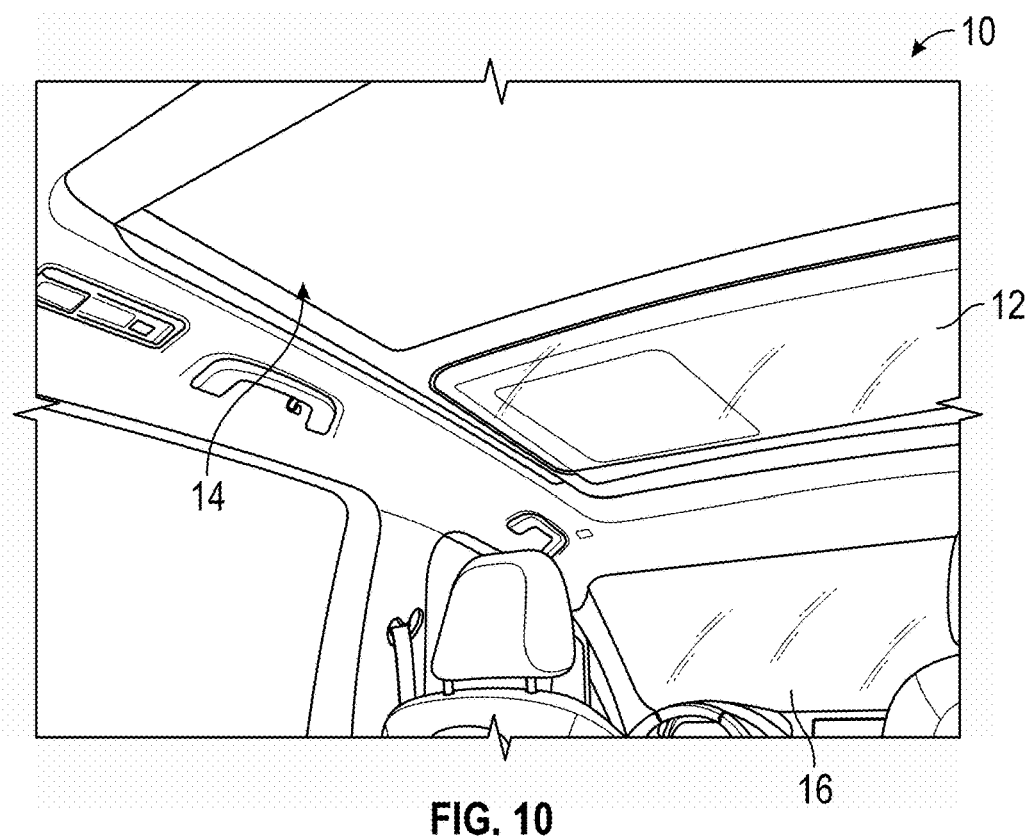
FIGS. 10 and 11 are partial interior views of a vehicle with a deployable item or deployable display or deployable component in accordance with an embodiment of the present disclosure, wherein the deployable item or deployable display or deployable component is illustrated as moving from the stowed or first position to the second or deployed position.
Figure 11:
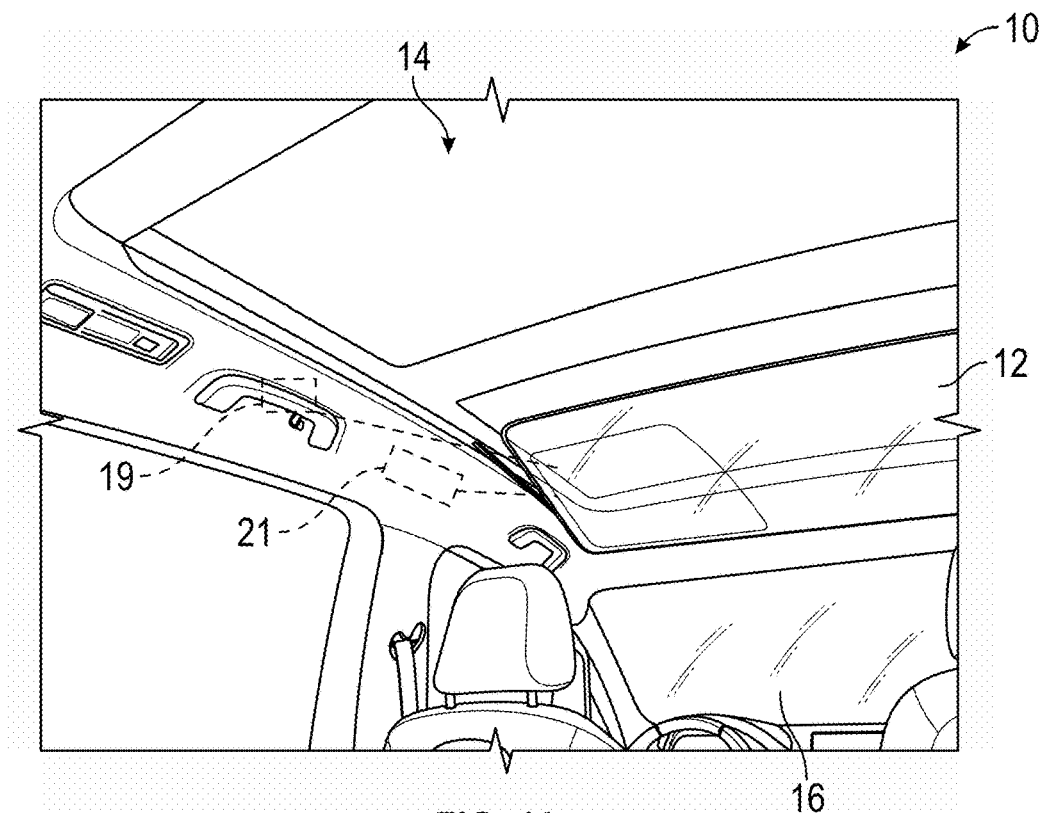
Figure 12:
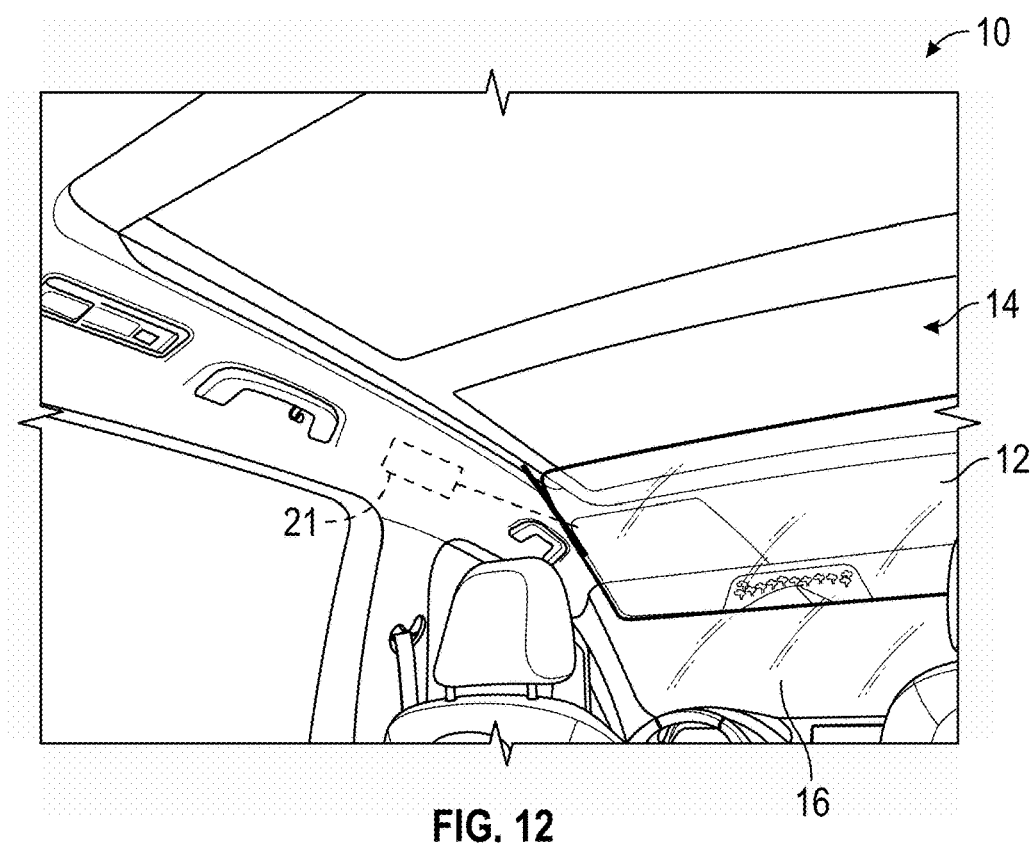
FIG. 12 is another partial interior view of a vehicle with a deployable item or deployable display or deployable component in accordance with an embodiment of the present disclosure, wherein the deployable item or deployable display or deployable component is in a second or deployed position and in one mode of operation.
Figure 13:
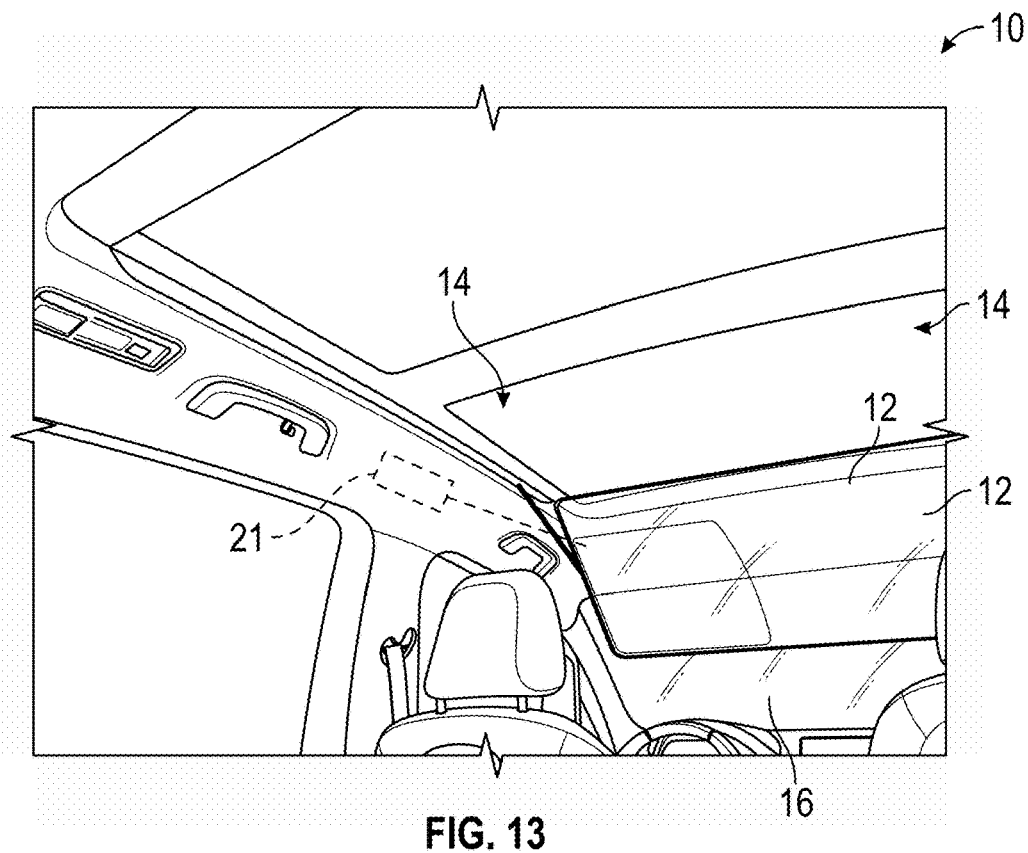
FIG. 13 is another partial interior view of a vehicle with a deployable item or deployable display or deployable component in accordance with an embodiment of the present disclosure, wherein the deployable item or deployable display or deployable component is in a second or deployed position and in another mode of operation.

FIGS. 10 and 11 illustrate movement of the deployable display or deployable component from the stowed or first position to the second or deployed position. FIG. 12 illustrates the deployable item or deployable display or deployable component in a second or deployed position and in one mode of operation while FIG. 13 illustrates the deployable item or deployable display or deployable component in a second or deployed position and in another mode of operation. In FIG. 12, the deployable item or deployable display or deployable component may be in viewing mode (e.g., camera inputs received) while in FIG. 13 the deployable item or deployable display or deployable component is illustrated in a sunscreen mode.

Figure 14:
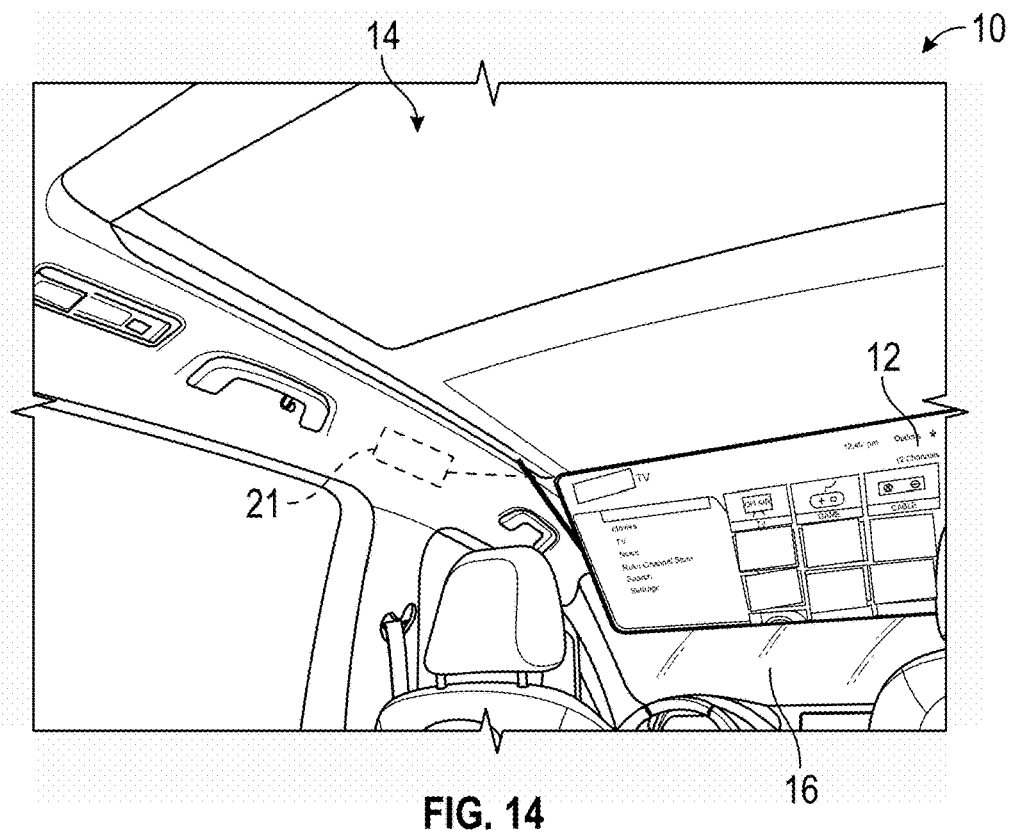
FIG. 14 is another partial interior view of a vehicle with a deployable item or deployable display or deployable component in accordance with an embodiment of the present disclosure, wherein the deployable item or deployable display or deployable component is in a second or deployed position and in yet another mode of operation.

FIG. 14 is another partial interior view of a vehicle with the deployable item or deployable display or deployable component in a second or deployed position and in yet another mode of operation. In this embodiment, the deployable item or deployable display or deployable component may be in an entertainment mode.

Figure 15:
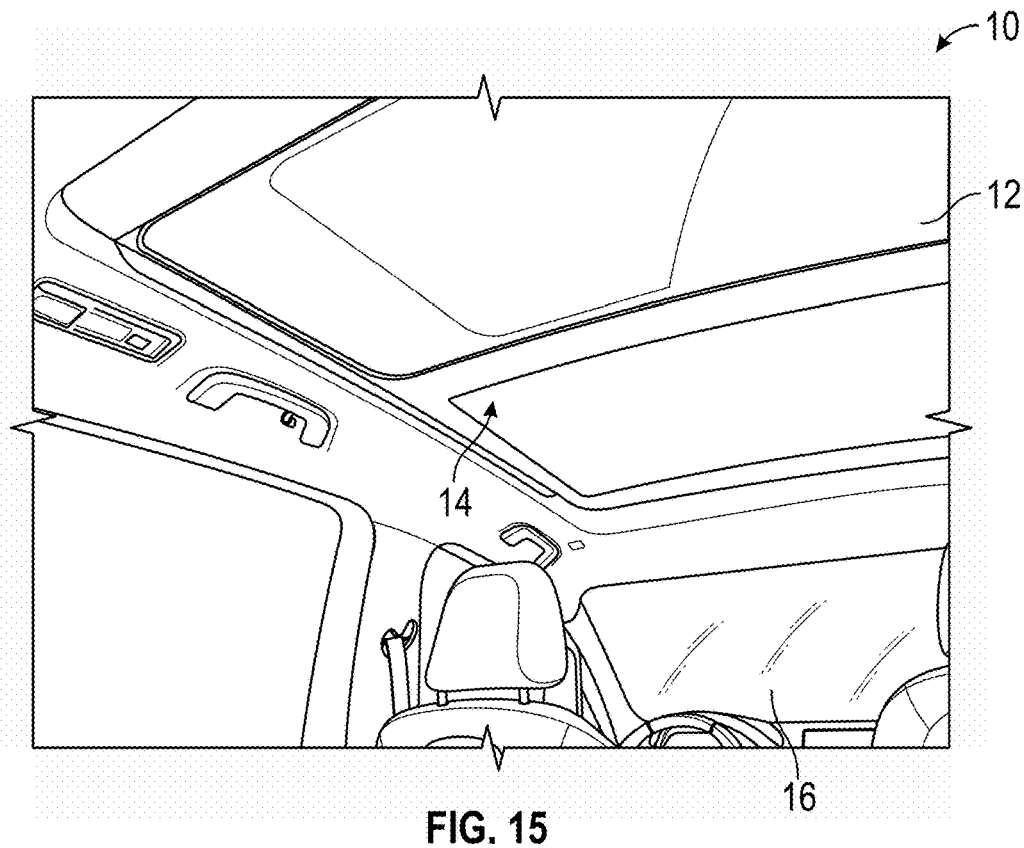
FIG. 15 is another partial interior view of a vehicle with a deployable item or deployable display or deployable component in accordance with another embodiment of the present disclosure, wherein the deployable item or deployable display or deployable component is in a first position or stowed position.

FIG. 15 is another partial interior view of a vehicle with a deployable item or deployable display or deployable component in accordance with another embodiment of the present disclosure, wherein the deployable item or deployable display or deployable component is in a first position or stowed position. In this illustrated embodiment, the deployable item or deployable display or deployable component is deployable into the rear seat of the vehicle.

Figure 16:
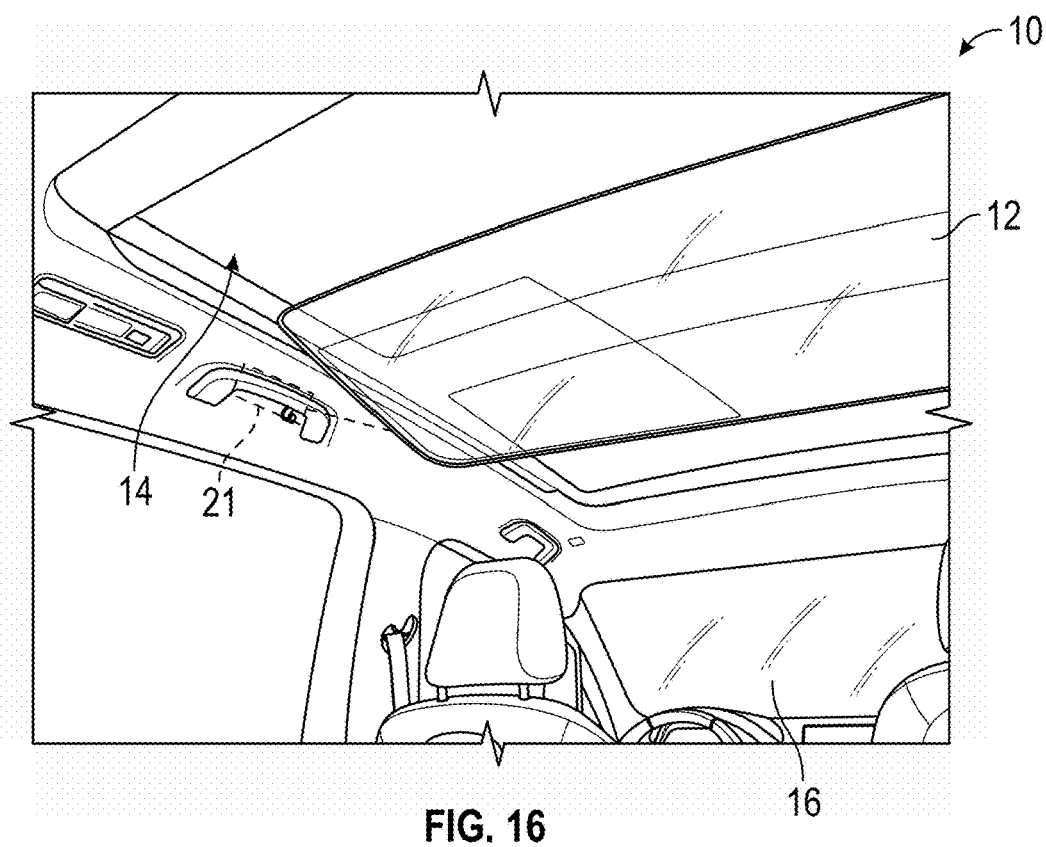
FIGS. 16 and 17 are partial interior views of a vehicle with a deployable item or deployable display or deployable component in accordance with yet another embodiment of the present disclosure, wherein the deployable item or deployable display or deployable component is illustrated as moving from the first position or stowed position to second or deployed position.
Figure 17:
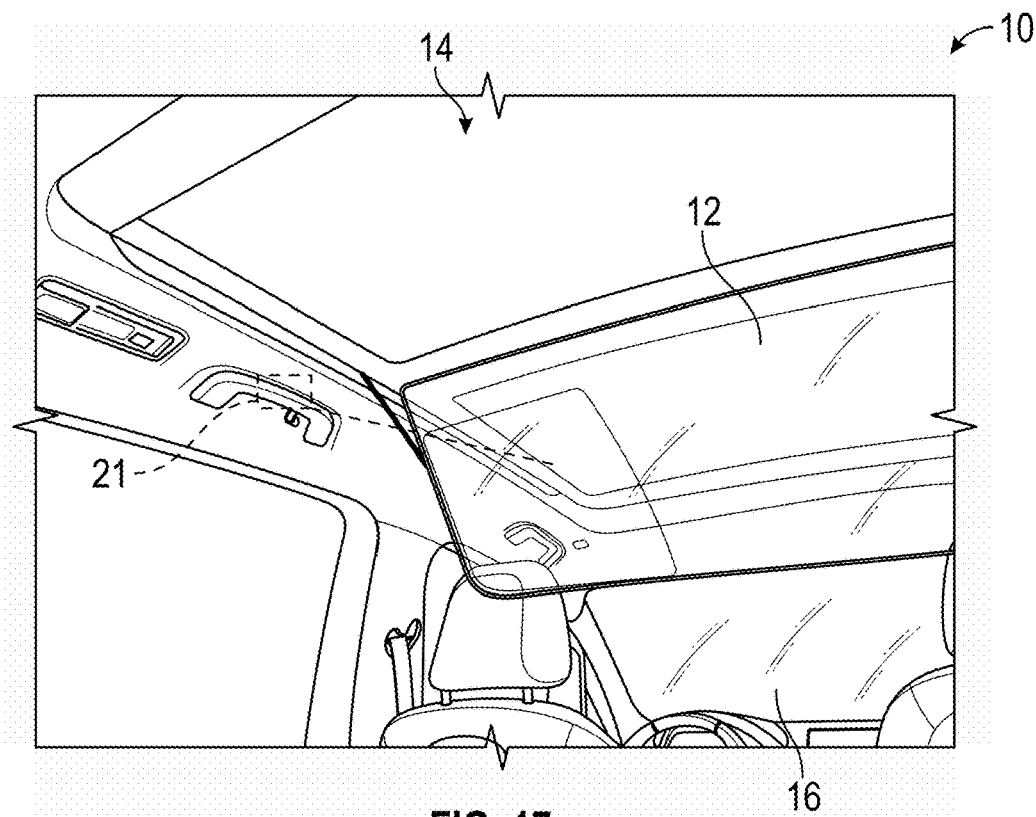

FIGS. 16 and 17 illustrate movement of the deployable display or deployable component from the stowed or first position to the second or deployed position in accordance with the FIG. 15 embodiment.

Figure 18:
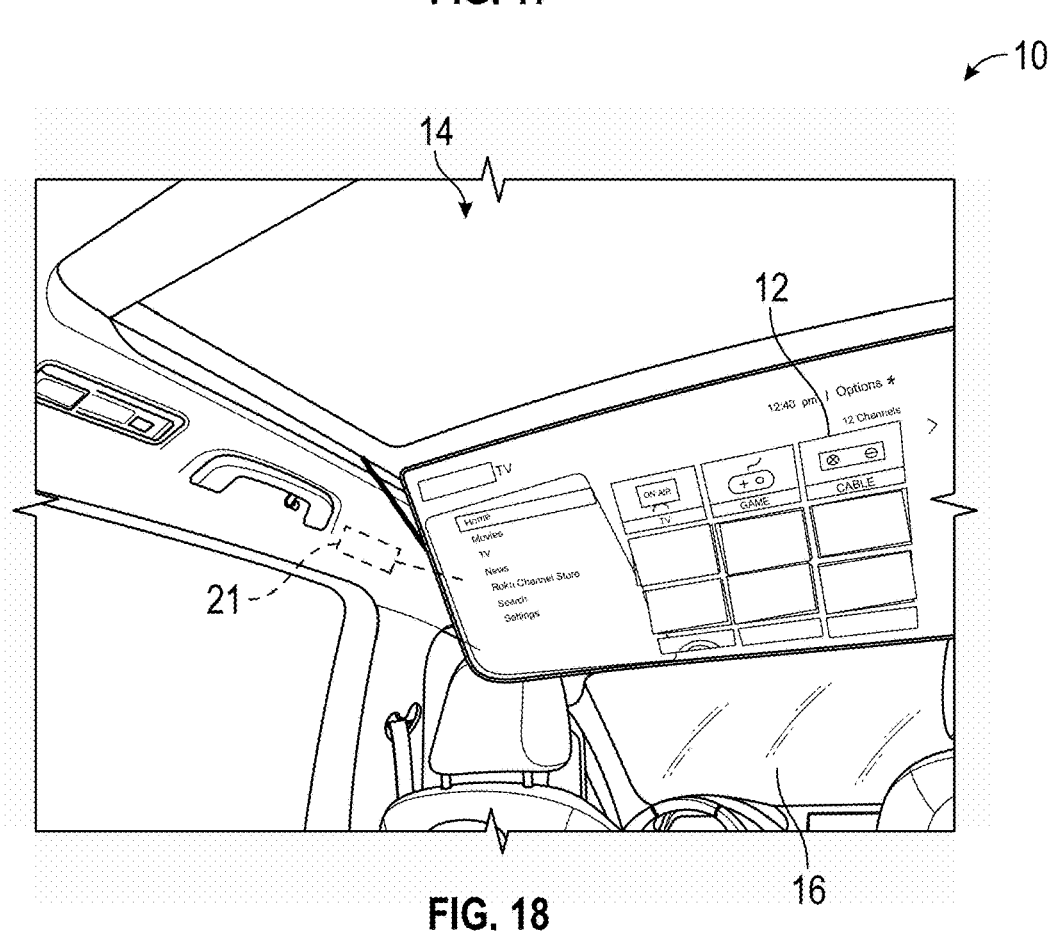
FIG. 18 is a partial interior view of a vehicle with the deployable item or deployable display or deployable component in a second or deployed position according to another embodiment and in a first mode of operation.

FIG. 18 is a partial interior view of a vehicle with the deployable item or deployable display or deployable component in a second or deployed position in accordance with the FIG. 15 embodiment and in an entertainment mode.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A deployable display for use in a vehicle, wherein the deployable display can be positioned in a plurality of stowed or a plurality of deployed positions, wherein the deployable display functions as a sun visor located in front of a windshield of the vehicle when it is in a first one of the plurality of deployed positions and when the deployable display is in a second one of the plurality of deployed positions or the first one of the plurality of deployed positions the deployable display functions as a screen that provides images from a controller operatively coupled to the deployable display.

2. The deployable display as in claim 1, wherein the deployable display is a liquid crystal display or an organic light-emitting diode display.

3. The deployable display as in claim 1, wherein the deployable display is an organic light-emitting diode display deployed from a roller.

4. The deployable display as in claim 1, wherein one of the plurality of stowed positions is adjacent to the windshield of the vehicle and another one of the plurality of stowed positions is above a rear seat of the vehicle.

5. The deployable display as in claim 1, wherein the second one of the plurality of deployed positions is located in a rear seat of the vehicle.

6. The deployable display as in claim 1, wherein the deployable display is operatively coupled to a camera that provides views from a rear or sides or front of the vehicle.

7. The deployable display as in claim 1, wherein the deployable display is integrated with a roof system of the vehicle.

8. The deployable display as in claim 1, wherein the deployable display is provided with a viewing area that has an area less that the entire viewing area of the deployable display and the deployable display is operably coupled to a camera such that views from the rear or sides or front of the vehicle are provided in the viewing area.

9. The deployable display as in claim 1, wherein the deployable display is operatively coupled to data storage to provide anyone of visual displays, instrument and sensor readings, and GPS displays.

10. The deployable display as in claim 9, wherein the data storage is associated with the controller.

11. The deployable display as in claim 1, wherein the deployable display is a flexible display that is wound and unwound from a roller.

12. The deployable display as in claim 1, wherein the roller is integrated with the roof system of the vehicle.

13. The deployable display as in claim 1, wherein the roller is integrated with an instrument panel of the vehicle.

14. The deployable display as in claim 1, wherein the roller and the deployable display is divided into two components such that the deployable display on one side of the roller may be positioned in a different location than the deployable display on the other side of the roller.

15. The deployable display as in claim 1, wherein the roller and the deployable display is divided into multiple components that are located in multiple locations within the vehicle.

16. The deployable display as in claim 1, wherein the deployable display when in the stowed position may be used as anyone of the following: a) a screen saver; b) ambient lighting; c) simulated environments; d) entertainment display; e) tinting; f) video conferencing; g) vanity mirror; and combinations thereof.

17. The deployable display as in claim 1, wherein the deployable display when in the deployed position may be used as anyone of the following: a) a sun visor; b) a rearview mirror; c) a heads up display; d) points of interest provided on a map; e) augmented reality; f) instrument panel cluster information; and combinations thereof.

18. A method of providing a deployable display in a vehicle, comprising:
    positioning the deployable display in a plurality of stowed or a plurality of deployed positions, wherein the deployable display functions as a sun visor located in front of a windshield of the vehicle when it is in a first one of the plurality of deployed positions and when the deployable display is in a second one of the plurality of deployed positions or the first one of the plurality of deployed positions the deployable display functions as a screen that provides images from a controller operatively coupled to the deployable display.

19. A vehicle comprising, a deployable display, wherein the deployable display can be positioned in a plurality of stowed or a plurality of deployed positions, wherein the deployable display functions as a sun visor located in front of a windshield of the vehicle when it is in a first one of the plurality of deployed positions and when the deployable display is in a second one of the plurality of deployed positions or the first one of the plurality of deployed positions the deployable display functions as a screen that provides images from a controller operatively coupled to the deployable display.

20. The vehicle as in claim 18, wherein the vehicle is an autonomous vehicle.

* * * * *